United States Patent Office 3,431,097
Patented Mar. 4, 1969

3,431,097
METHOD OF PREVENTING REVERSION IN THE PREPARATION OF AMMONIUM PHOSPHATES BY THE ADDITION OF VERMICULITE
Adolfo MacCragh, Ellicott City, Moises G. Sanchez, Severna Park, and Jean G. Smith, Baltimore, Md., assignors to W. R. Grace & Co., New York, N.Y., a corporation of Connecticut
No Drawing. Filed Dec. 14, 1965, Ser. No. 513,853
U.S. Cl. 71—43           3 Claims
Int. Cl. C05b 11/08, 11/06

ABSTRACT OF THE DISCLOSURE

A method for preparing a fertilizer material comprising acidulating phosphate rock with an acid selected from a group consisting of nitric, phosphoric and sulfuric acids and mixtures thereof. Vermiculite is added to the acidulate to block reversion of the phosphorus to its citrate-insoluble form. The acidulate is neutralized by the addition of ammonia to raise the pH of the mixture to at least 6.

---

This invention is directed to fertilizers and is particularly applicable in one of its aspects to a process for producing fertilizers in which phosphate rock is acidulated and then neutralized and in another of its aspects to new slurry fertilizer products.

An object of this invention is to provide a slurry fertilizer having optimal physical and chemical characteristics.

Another object of this invention is to improve the process of producing fertilizers in which phosphate rock is acidulated and then neutralized.

A further object of this invention is to provide an inexpensive method for producing a slurry fertilizer that is very resistant to settling during quiescent storage and in which such sediment as does form is characterised by being easily redispersed by agitation.

Still another object of this invention is to provide an inexpensive method of producing a slurry fertilizer by acidulating raw phosphate rock with an acid and ammoniating the mixture to obtain a neutralized slurry fertilizer containing chemically reduced phosphate rock with a high citrate soluble $P_2O_5$ content and excellent physical and agricultural properties.

In summary, a fertilizer is produced by introducing acid and phosphate rock into a reaction zone in an acid to phosphate rock ratio that will render the phosphate in the rock at least 85% plant available. An acid-phosphate rock mixture is produced and enough vermiculite is added to the mixture to prevent reversion of the phosphate from the phosphate rock to a plant available level below 85%. The acid-phosphate rock-vermiculite mixture is at least partially neutralized.

In a preferred embodiment, the phosphate rock is acidulated to a citrate soluble phosphate level of at least 90% and frequently 97% of its total phosphate content. The vermiculite is through 150 Tyler screen size and added in an amount of 0.1–0.3 gram per gram of $P_2O_5$ while the pH of the mixture is below 1.5. The vermiculite is digested for at least about 15 minutes and the mixture is neutralized to at least a pH of 5 using anhydrous ammonia. The temperature of the reaction mixture is maintained at 90° C. or less. The slurry product has a high plant available phosphate content, a stable pH and good rheology after prolonged storage.

Further aspects of the present invention will become apparent hereinafter and the specification concludes with claims particularly pointing out and distinctly claiming the subject matter which we regard as our invention. The invention, however, as to organization and method of operation, together with other objects and advantages thereof, may best be understood by reference to the following description.

The term "slurry fertilizer" as used herein designates a fertilizer that is a liquid suspension. Generally, the slurry contains nutrient salts in finely divided solid form and in solution. The slurry fertilizer also contains other substances that have been added to aid in processing the slurry and to improve the chemical and physical properties of the slurry fertilizer. Other active and inert substances may also be present as by-products or by reason of deliberate addition.

The abbreviations 9–9–9 and 10–10–10 are used in this application. They represent the grade or analysis of a fertilizer. These series represent the N-P-K or nitrogen-phosphorus-potassium values of a fertilizer expressed as the ratio in weight equivalents of $N$-$P_2O_5$-$K_2O$. While phosphorus is expressed as $P_2O_5$ and potassium as $K_2O$, the elements may actually be present in other chemical forms. APA represents available phosphoric anhydride (as $P_2O_5$) which is the citrate soluble portion of the phosphate. The citrate soluble portion of the phosphate is the portion that is generally regarded to be available to the plant. Ammoniation is used in its broadest sense and includes the introduction of ammonia as an aqueous solution or a gas or as a substance such as urea which releases ammonia when heated.

In general, monocalcium phosphate is water and citrate soluble, dicalcium phosphate is citrate soluble but water insoluble and tricalcium phosphate is both water and citrate insoluble. Generally plant nutrients that are either water or citrate soluble are considered available plant nutrients and those that are both water and citrate insoluble are considered unavailable and cannot be counted in determining fertilizer grades. Reversion refers to the changing of phosphorus from an available to an unavailable form.

By the process of acidulation unavailable phosphorus in naturally occurring phosphate rock can be converted to an available form. Neutralization can have the effect of causing available phosphate to revert to an unavailable form. Water soluble nutrients tend to leach out of soils when water flows through the soil, while citrate soluble nutrients are resistant to leaching. Thus, the conversion of water soluble phosphate to citrate soluble phosphorus is a useful change because it reduces the loss of the phosphate due to leaching.

In a preferred form slurry fertilizer preparation involves treating phosphate rock to improve its agricultural values in a way that will not require refining the treated rock to remove its impurities. Generally, the treatment of the phosphate rock involves the two major steps of acidulation and ammoniation. The phosphate rock may be acidulated with nitric acid, phosphoric acid, sulfuric acid or mixtures thereof. The acid and phosphate rock are mixed together to bring the acid into contact with the surfaces of the phosphate rock. The acid digests the phosphate rock converting it to monocalcium phosphate. The fertilizer slurry is then formed by passing anhydrous ammonia through the system which precipitates the water soluble monocalcium phosphate as water insoluble, but citrate soluble and hence plant available, dicalcium phosphate.

In a normal uncontrolled system if neutralization proceeds above a pH of about 1.5, much of the water soluble monocalcium phosphate will revert to a citrate insoluble tricalcium phosphate form which is not considered to be a desirable fertilizer material. Reversion is greatly increased in the uncontrolled system if the temperature is allowed to rise to the boiling point. Because of the large amount of heat created by the neutralizing reaction of ammoniation, a great deal of cooling capacity is required if the temperature is to be controlled. In the normal situation such temperature control is very expensive and, therefore, often economically impractical.

A good slurry fertilizer should meet several requirements. First, the nutrient material should be in a form that will have good agricultural properties, in other words, in plant available form. In addition, the end-pH after ammoniation should be near neutral and the end-pH should not drift downward during storage. An acidic pH may cause both corrosion and agronomic problems. It is also very desirable to have a product slurry that will remain in suspension during prolonged storage so that it can be prepared in advance and stored. Neither irreversible settling nor uncontrollable gelation can be tolerated.

By this invention a small quantity of vermiculite is added to the system during the processing of slurry fertilizers. It has been found that with the proper addition of the vermiculite, reversion can be substantially eliminated as a processing problem, the terminal pH's of the process and the pH of the product on storage can be substantially stabilized, and good rheological properties can be secured. The rheology of the product can be such that the product is fluid, homogeneous and non-settling during prolonged storage. The vermiculite can be ordinary unexfoliated vermiculite.

The maximum benefit is obtained from vermiculite addition in a system in which phosphoric acid is included as an acidulating and phosphate contributing agent in an amount of from 10 to 50% of the phosphate content of the end product on a weight basis and phosphate rock contributes 50–90% of the phosphate content of the end product on a weight basis. For maximum benefit the vermiculite should have a particle size no larger than through 150 Tyler screen. From 0.1 to 0.3 gram of vermiculite should be added per gram of $P_2O_5$ after the substantially complete digestion of the phosphate rock. Generally, for the best results the vermiculite should be acidulated or digested by the acid mixture of acid and phosphate rock for 25–45 minutes before the neutralization of the system is begun.

To obtain the best rheology the temperature of the system should be maintained at 90° C. or less at all times. It is generally desirable to finish the pH off at 6.5 or higher depending on the desired nitrogen content. However, pH's of 6.0 to 6.5 are very good and materials at these pH's are usually considered noncorrosive to mild steel. It takes less ammonia to reach a given pH in a vermiculite system than in a non-vermiculite system. Generally, the vermiculite would be added well before a pH of 3 is attained and neutralization should be continued well beyond a pH of 3.

A vermiculite system that includes phosphoric acid as one of the acidulating agents in an amount that equals 10 to 50% of the phosphate content of the end product on a weight basis is ideal. The improvement in available phosphorus obtained by using vermiculite is something on the order of 50% greater when the vermiculite is used in a system including phosphoric acid in the proper proportion than when only nitric acid is used as the acidulating agent. The same is true for pH stability. Rheology is not improved very much by the use of vermiculite when the system does not include phosphoric acid.

To be fully effective the vermiculite must be added before the system has been neutralized to an extent that would cause a significant degree of reversion. Substantial reversion has been found to occur at pH's above 1.5 when no vermiculite is added to the system. The vermiculite is preferably added after the digestion of the phosphate rock is substantially completed but before ammoniation is begun. The digestion period should be at least 15 minutes, and preferably from 25 to 45 minutes, after vermiculite addition is completed and before ammoniation is begun if the vermiculite is to be fully effective. The temperature of the system during the vermiculite digestion period is preferably at least 60° C.

The vermiculite becomes more effective as its particle size decreases. This is especially important for maximum end-pH stability and for improving the rheology of the end product. The preferred ultimate size for this vermiculite is at least 150 Tyler screen size, although finely divided vermiculite up to a 28 Tyler screen size can be used satisfactorily. The coarser the vermiculite particles are the faster the ammoniation must be in order to achieve good storage properties. Of course, temperature control is more difficult at high ammoniation rates.

Generally, the preferred range of vermiculite addition is between 40–60 grams of vermiculite per 1000 grams of phosphate rock. A typical phosphate rock contains 340 grams of $P_2O_5$ per 1000 grams of rock. Very finely divided vermiculite has a good effect on APA (+97% conversion) and on pH stabilization at a level between 30 and 40 grams of vermiculite per 1000 grams of rock but 40 grams are required to provide a good effect on rheology. Up to 100 grams of vermiculite per 1000 grams of phosphate rock can often be used without deleteriously effecting the slurry to such an extent that its fluid characteristics are impaired. In certain instances, when the phosphate rock used is particularly inferior, up to 100 grams of vermiculite per 1000 grams of phosphate rock may be required to maintain a high APA. Generally speaking, the overall limits within which the vermiculite may be used are from 30 to 100 grams of vermiculite per 1000 grams of phosphate rock. From the standpoint of APA, the vermiculite to phosphorus ratio is believed to constitute the most important consideration in most situations because the phosphate rock supplies enough calcium to induce a significant degree of reversion even when part of the phosphorus comes from a non-rock source.

If a complete fertilizer is to be prepared, i.e., a fertilizer containing N, P, and K values, then potassium chloride should be added to the process system. Generally, this should be done after the system is sufficiently neutral to substantially eliminate the problem of the potassium chloride reacting with acid and producing hydrochloric acid. The potassium chloride can be added immediately after the pH rises above about 3 and then the pH can be raised to its desired end pH level, or neutralization can be continued to 6 and above, as in the examples, and then potassium chloride added. The addition of the potassium chloride before the end of the neutralization of the system helps to maintain a lower operating temperature because the potassium chloride is usually at approximately the normal ambient temperature while the chemical reactions have caused the reaction mixture to have a higher temperature. Other agriculturally beneficial materials may also be added to the slurry fertilizer during its processing or just before it is applied agriculturally.

The slurry product contains acid reduced phosphate rock, nitrogen, and vermiculite. If a complete fertilizer is desired the product will, of course, also contain potassium. Much of the vermiculite has usually been reduced by the acid to a highly porous silica residue having the flaky laminar structure of the vermiculite ore. A very modest expansion often takes place in the vermiculite. In its preferred form the fertilizer product has a high citrate soluble phosphate content (97–100%), a pH stabilized above 6, is sufficiently fluid to be sprayed, and is homogeneous and relatively non-settling during storage. Any sediment that does form in the preferred form of the slurry product is of such a nature that it can be easily resuspended with mild agitation.

The following examples describe without limiting the invention.

Example 1

A 10–10–10 slurry fertilizer was prepared in the following manner. A solution was prepared by mixing 517 ml. of reagent grade nitric acid (containing 70–71% by weight $HNO_3$), 28 ml. of reagent grade phosphoric acid (85% by weight $H_3PO_4$) and 389 ml. of deionized water in a "Pyrex" glass container, equipped with a mechanical stirrer, a thermometer and a reflux condenser. To this solution was added 500 g. of ground Florida phosphate rock of the following composition:

| | Wt. percent |
|---|---|
| $P_2O_5$ | 33.90 |
| CaO | 47.79 |
| $Al_2O_3$ | 1.95 |
| $Fe_2O_3$ | 1.17 |
| $F^-$ | 3.79 |
| $SO_4^=$ | 0.88 |
| $SiO_2$ | 5.36 |
| $Cl^-$ | 0.11 |

The phosphate rock was added to the acid mixture over a period of five minutes, during which the temperature of the system rose to 55° C. Five ml. of a 1:3 Na salt of sulfonated oleic acid-water solution was added simultaneously with the addition of the phosphate rock to relieve foaming. After the completion of the rock addition the temperature was further increased to 60° C. and held there during a 15 minute digestion period. Then 25.6 grams of through 200 mesh Tyler screen vermiculite was added, the temperature was increased to 65° C., and the whole system digested for an additional 15 minutes while vigorous stirring was continued.

The vermiculite was approximately through 48 and on 200 Tyler screen ore obtained from the Enoree, South Carolina region from the Kearney Mills of the Zonolite Division of W. R. Grace & Co., at Enoree, S. C. The vermiculite was further reduced in size by grinding in a Wheeler mill to reduce particle size. Only the through 200 mesh Tyler screen fraction was used in this experiment. Chemical composition was as follows:

| | Wt. percent |
|---|---|
| $SiO_2$ | 42.12 |
| MgO | 17.79 |
| $Al_2O_3$ | 10.84 |
| $Na_2O$ | 9.18 |
| $Fe_2O_3$ | 9.01 |
| $P_2O_5$ | 1.10 |

Following the digestion of the vermiculite, the system was heated to 85° C. during an 8 minute period and after this ammoniation was begun. Anhydrous ammonia (82% N) was sparged into the mixture below the agitator blade at the rate of 0.48 gram/minute, for two hours and forty-five minutes. This was a total of 79 grams of anhydrous ammonia. Of course, a small portion of the ammonia was lost from the surface of the mixture as vapor. The temperature of the mixture was maintained at 85° C. throughout the ammoniation period. The bath was stirred continuously during ammoniation.

After ammoniation 323 grams of reagent grade potassium chloride (62% $K_2O$ by weight) was stirred into the slurry. The pH decreased from 7.5 to 6.7 when the potassium chloride was added. There was no further drop on aging. The reflux condenser was used during ammoniation to maintain the water content substantially constant by returning the water evaporated from the batch back to the batch.

The finished slurry displayed excellent suspension properties and outstanding stability. Short-term settling was negligible. After 7 months of standing, there was some phase separation, but the appearance of the original slurry could be restored merely by shaking.

The phosphate content of the product slurry was 9.90% including 0.04% citrate-insoluble phosphates. The ratio of available to total phosphates was 0.996.

Example 2

A 9-9-9 slurry fertilizer was prepared using the procedure of Example 1 and a coarser vermiculite. The slurry yielded had good end pH stability and phosphate availability but its suspension properties were less desirable than when the very finely-divided vermiculite was used.

A solution of 517 ml. of reagent grade nitric acid (70–71% by weight $HNO_3$), 34 ml. of phosphoric acid and 389 ml. of water was prepared as in Example 1.

The phosphoric acid used was of technical grade and green in color; it gave the following analysis:

| | Wt. percent |
|---|---|
| $P_2O_5$ | 56.10 |
| $Al_2O_3$ | 1.24 |
| $Fe_2O_3$ | 1.08 |
| $F^-$ | 0.18 |
| $SiO_2$ | 0.03 |
| $SO_4^=$ | 1.46 |
| $Cl^-$ | 0.01 |
| $NO_3^-$ | 0.04 |

500 grams of phosphate rock was added to the acid mixture over a period of five minutes, during which the temperature of the system rose to 59° C. The phosphate rock was the same type described in Example 1. Five ml. of a 1:3 Na salt of sulfonated oleic acid-water solution was added simultaneously with the addition of the phosphate rock to relieve foaming. During the next 24 minutes the temperature was increased to 65° C. while vigorous stirring was continued. Then 25.6 grams of vermiculite was added to the batch and the batch was held for 30 minutes at 65° C.

Next the temperature was raised to 85° C. and then anhydrous ammonia was added at 0.65 gram/minute until the batch reached a pH of 8.0 which required 2 hours. This was a total of 78 grams of ammonia. The mixture was stirred continuously. After this 323 grams of reagent grade potassium chloride (62% $K_2O$) was stirred into the batch. The pH decreased from 8.2 to 7.7 when the potassium chloride was added. The vermiculite was through 65 Tyler screen vermiculite obtained from the same source as the vermiculite of Example 1.

The phosphate content of the final slurry was 9.60%, including 0.04% citrate-insoluble phosphates. The ratio of available to total phosphates was 0.996.

Example 3

A 9-9-9 slurry fertilizer was prepared as in Example 2, but without any vermiculite being added.

The procedure followed was that of Example 2, except that after the 24 minute period during which the temperature was increased to 65° C. it was further raised gradually during the next 8 minutes to 85° C. While maintaining the temperature at 85° C., a stream of anhydrous ammonia was sparged into the system for two hours at the rate of 0.8 gram of $NH_3$/minute. This was a total of 96 grams of ammonia. The pH was 7 at this time. Then 323 grams of potassium chloride was stirred into the batch. The pH dropped to 2.6 during the potassium chloride addition, and 16 additional grams of anhydrous ammonia was required to restore the system to a pH of 7. The drop in pH when the potassium chloride was added was much greater than in Example 1 where very finely-divided vermiculite was used.

The phosphate content of the final slurry was 9.60% including 1.16% citrate-insoluble phosphate. The ratio of available to total phosphate was 0.88. It may be readily seen that without vermiculite the phosphate reversion was 29 times greater. The rheology was also visually observed to be inferior to the rheology of the product in Example 1.

Example 4

A 9-9-9 slurry fertilizer was prepared as in Example 1, but using an ammoniation rate three times greater and with the temperature during ammoniation being allowed to rise to 112° C.

500 g. of phosphate rock was acidulated as in Example 2 except the rock was added over an 11 minute period.

The phosphate rock used in this example was of the following composition:

| | Wt. percent |
|---|---|
| $P_2O_5$ | 33.70 |
| CaO | 48.04 |
| $Al_2O_3$ | 1.45 |
| $Fe_2O_3$ | .99 |
| $F^-$ | 3.63 |
| $SO_4^=$ | .94 |
| $SiO_2$ | 4.04 |

After the 15 minutes phosphate rock digestion period 25.6 grams of vermiculite was added to the phosphate rock-acid mixture. The mixture was then stirred for one hour at 65° C. before ammoniation was begun. The vermiculite used was No. 5 vermiculite of the type discussed in Example 2. Only that part of the vermiculite that would pass through a 150 mesh Tyler screen was used.

Next, ammoniation was carried out by sparging anhydrous ammonia into the mixture at the rate of 2.88 grams $NH_3$/minute for 40 minutes. This was a total of 115 grams of anhydrous ammonia. At higher ammoniation rates the loss of ammonia from the system is increased. The temperature rose to 112° C. in about 15 minutes. The temperature remained between 112° and 105° C. during the remaining 25 minutes. The pH rose to 8.0 by the time ammoniation was completed. Then 323 grams of reagent grade potassium chloride (62% $K_2O$) was added and on standing for about 2 weeks the slurry dropped in pH to 5.4.

The phosphate content of the product slurry was 9.50%, including 0.24% citrate-insoluble phosphate. The ratio of available to total phosphate was 0.975.

Example 5

A 9-9-9 slurry fertilizer was prepared by a method similar to that of Example 4, but the temperature was not allowed to rise above 85° C. during ammoniation.

The procedure followed was that of Example 4, except that the rate of ammoniation was 2.5 grams/$NH_3$/minute. This was a total of 100 grams of anhydrous ammonia. The temperature was allowed to rise naturally to 85° C. in about 5 minutes during ammoniation and it was maintained constant at 85° C. for the remainder of the ammoniation period. The pH of the system before the potassium chloride was added was 8.4, the pH dropped to 8.2 after the slurry had stood for 8 days.

The phosphate content of the final product was 9.00% including 0.08% citrate insoluble phosphates. The ratio of available to total phosphates was 0.99.

Example 6

A 9-9-9 slurry fertilizer was prepared by a method similar to that of Example 4, but no vermiculite was added.

The procedure was that of Example 4, except that after the rock addition the phosphate rock-acid mixture was held at 65° C. for 15 minute with vigorous stirring and then ammoniation was begun. Ammoniation was carried out at the rate of 3.16 grams/$NH_3$/minute for 40 minutes at which time the pH was 7.5. A total of 126 grams of anhydrous ammonia was used. The temperature rose to 112° C. in 15 minutes. At this time the pH was 0.3. The temperature remained between 112° and 105° C. during the remaining 25 minutes. Reagent grade potassium chloride was added at the end of ammoniation and the resulting slurry pH dropped to 5.4 upon standing 11 days.

The phosphate content of the final product was 10.60% including 3.52% citrate-insoluble phosphates. The ratio of available to total phosphate was 0.67.

While in accordance with the patent statutes, we have described what at present is considered to be the preferred embodiment of this invention, it will be obvious to those skilled in the art that various changes and modifications may be made without departing from the present invention, and we, therefore, aim in the following claims to cover all such equivalent variations as fall within the true spirit and scope of this invention.

We claim:

1. A method for preparing a slurry fertilizer comprising the steps of; acidulating phosphate rock with an acid selected from the group consisting of nitric, phosphoric and sulfuric acid and mixtures thereof to convert at least 90% of the phosphorous contained in said phosphate rock to a plant available form, thoroughly mixing said phosphate rock and said acid to form an acidulation mass while maintaining the pH thereof below 1.5, blocking reversion of said phosphorus to a level below 90% plant available phosphorus by the addition of from about 30–100 grams of vermiculite per 1000 grams of phosphate rock, said vermiculite having a maximum particle size of through 28 Tyler screen, neutralizing said acidulate by the addition of ammonia into said acidulate and continuing said neutralization step until the pH of the mixture is at least 6.

2. A method according to claim 1 wherein after completion of the vermiculite addition, at least a 15 minute vermiculite digestion period is allowed before neutralization is begun.

3. A method according to claim 1 wherein the vermiculite has been substantially reduced to a highly porous silica residue having a flaky laminar structure before addition of said vermiculite to said acidulate.

References Cited

UNITED STATES PATENTS 3,109,729 11/1963 Slack et al. _____ 71—41 X
3,179,496 4/1965 Skinner et al. _____ 71—43 X DONALL H. SYLVESTER, *Primary Examiner.*

R. D. BAJEFSKY, *Assistant Examiner.*

U.S. Cl. X.R.

23—106; 71—62